United States Patent [19]

Orlinsky et al.

[11] Patent Number: 5,001,466

[45] Date of Patent: Mar. 19, 1991

[54] EARTHQUAKE DETECTOR

[75] Inventors: David E. Orlinsky, Los Angeles, Calif.; Kenneth D. Caillat, Zephyr Cove, Nev.

[73] Assignee: Quakeawake Corporation, Los Angeles, Calif.

[21] Appl. No.: 285,199

[22] Filed: Dec. 15, 1988

[51] Int. Cl.$^5$ ............................................. G08B 21/00
[52] U.S. Cl. .................................. 340/690; 340/669; 340/540; 200/61.47; 73/654
[58] Field of Search ............... 340/690, 669, 540, 522, 340/521; 200/61.47; 310/329; 73/654

[56] References Cited

U.S. PATENT DOCUMENTS

| | | | |
|---|---|---|---|
| 3,186,237 | 6/1965 | Forrest | 310/329 |
| 3,289,155 | 11/1966 | Parrack | 310/329 |
| 3,665,259 | 5/1972 | Brailsford | 310/329 |
| 3,714,456 | 1/1973 | Krohmer et al. | 340/540 |
| 4,297,690 | 10/1981 | Baker | 340/690 |
| 4,598,587 | 7/1986 | Dwyer et al. | 310/329 |
| 4,689,997 | 9/1987 | Windisch | 340/690 |

FOREIGN PATENT DOCUMENTS 0099277  6/1984  Japan ..................... 340/690

Primary Examiner—Joseph A. Orsino
Assistant Examiner—Geoff Sutcliffe
Attorney, Agent, or Firm—Freilich, Hronbaker & Rosen

[57] ABSTRACT

An earthquake detector is provided, which can sound an alarm several seconds before the arrival of the major shock of an earthquake, and which can be easily adjusted for sensitivity. For detecting local earth shaking of at least a predetermined dangerous acceleration level that constitutes a significant danger, a detector is provided that responds to shaking motion of an acceleration level between one-half and one-eighth the predetermined dangerous acceleration level to detect P-waves that arrive before the destructive S-waves, and which generates an audible alarm upon such detection. In one detector, two mercury-type switches are mounted with their directions of sensitivity both horizontal but perpendicular, the switches being mounted on a circuit board that can be tilted to alter their sensitivities. In another detector, a beam device includes a largely horizontal beam that has an inner end held on a mount and an outer end that supports a weight, and generates an electrical signal indicating the magnitude of beam deflection. The beam device can be formed by a strip of piezoelectric material which generates a voltage dependent upon beam deflection.

2 Claims, 2 Drawing Sheets

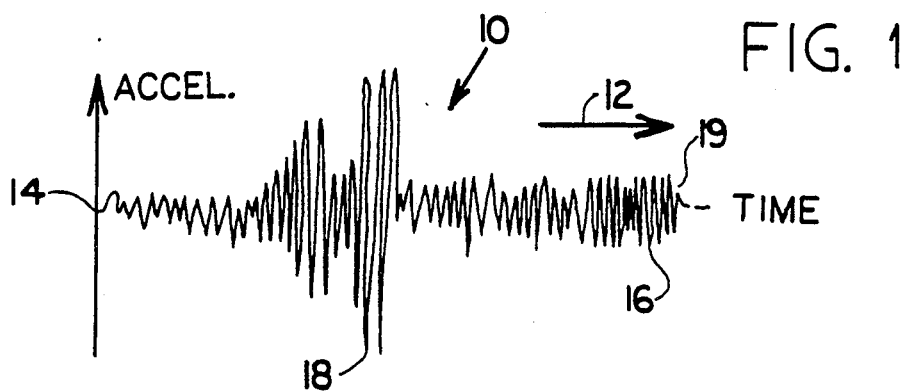
FIG. 1
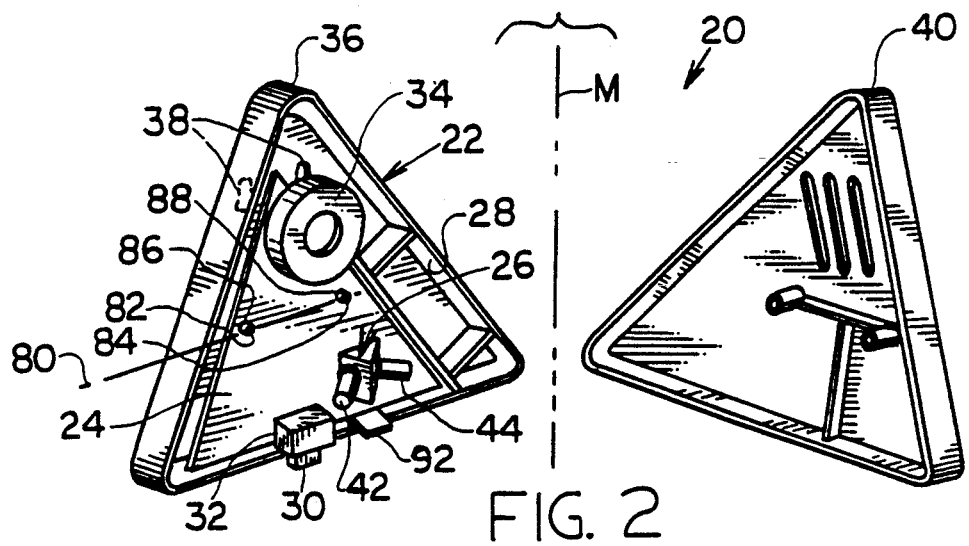
FIG. 2
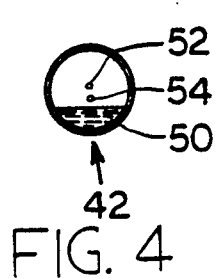
FIG. 2A
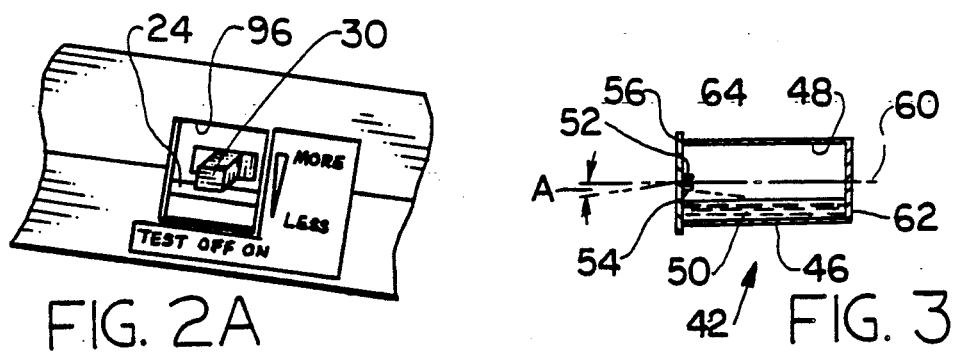
FIG. 3
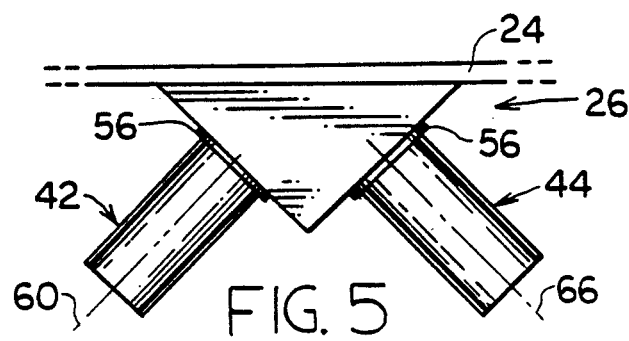
FIG. 4
FIG. 5

EARTHQUAKE DETECTOR

BACKGROUND OF THE INVENTION

Potentially destructive earthquakes such as those whose magnitude on the Richter scale is at least about 5.0, can produce damage over a wide area around the the earthquake epicenter. Earthquakes produce P (for primus) waves which are propagated as alternating compression and rarefaction of material similar to sound, and S (for secundus) waves which propagate by moving the earth at a right angle to the direction of the wave in a manner similar to propagation of surface waves in water. The P-waves travel at a rate of about 5.6 km per second (about 3.5 miles/sec), while the S-waves travel at a velocity a little more than half that of the P-waves (about 1.8 miles/sec). The P-waves are less energetic than the S-waves. Larger earthquakes can cause damage in areas 60 or more miles from the epicenter. It would be desirable if most of the potential victims could be alerted to the imminent arrival of destructive shocks, so they could seek shelter as by moving away from windows to locations under door frames and the like. While it would be possible to use an instrument that detects an earthquake near the epicenter to immediately sound alarms at location many miles away to alert persons of impending shocks, such systems would require an expensive network. A relatively simple apparatus that could warn persons of impending large shock waves, and that was of relatively simple and inexpensive construction, would be of considerable value.

Although persons become immediately aware of destructive shock waves, it is often useful to provide an independent detector which can awake persons who will sleep through the shock, and to shut off gas and/or electricity to minimize the possibility of fires. One type of detector includes a pendulum surrounded by a ring. Shaking motion of the earth causes the pendulum to swing against the ring and close an electrical circuit. U.S. Pat. No. 4,359,722 describes a detector of this type. A problem encountered with such detectors is that it is difficult to adjust their sensitivity. Persons who first install such a detector may want it to sound an alarm whenever a moderate shock is encountered such as from an earthquake of a level slightly exceeding 4.0 on the Richter scale whose epicenter is within about 30 miles. However, if there are too many "false alarms," as may be caused by slamming of doors or running in the house, such persons may wish to reduce the sensitivity, which is difficult to accomplish economically with a pendulum detector. A simple and low cost earthquake detector whose sensitivity could be easily adjusted, would be of considerable value.

SUMMARY OF THE INVENTION

In accordance with one embodiment of the present invention, a relatively simple and versatile apparatus is provided for detecting earthquakes. The apparatus can detect earthquakes whose shaking motions produce at least a predetermined local acceleration level which is potentially destructive, by providing a device that generates an alarm upon detection of a local acceleration less than half the predetermined potentially destructive level. The device therefore detects P-waves, which travel more rapidly than the more intense S-waves, to provide a detection that may be several seconds before the arrival of the more destructive earthquake shock, where the detection location is many miles from the epicenter of the earthquake. A warning time of several seconds allows persons to seek shelter before arrival of the major shock.

Apparatus for detecting earthquakes, whether by giving prior warning or indicating the arrival of the main shock, can be constructed at low cost by the use of mercury-type switches which include a chamber partially filled with an electrically conductive liquid and having a pair of electrodes that can be electrically connected by the liquid when the chamber walls are accelerated. Such switches are generally more sensitive to acceleration in a predetermined direction than in perpendicular directions. A pair of such mercury-type switches can be mounted on a major structural member of a building, with their directions of sensitivity oriented largely perpendicular to one another, to provide generally equal sensitivity to shaking in any horizontal direction. The sensitivity of the switches can be varied by mounting them on a device that can be tilted slightly to raise or lower the level of the conductive liquid with respect to the uppermost of the electrodes. In another earthquake detector, a flexible beam is oriented largely horizontally, with its outer end supporting a weight and its inner end clamped, and with a circuit that detects deflection of the beam. The beam can be constructed of piezoelectric material which generates a voltage of a magnitude dependent upon beam deflection, to provide a low cost mechanism.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified graph indicating variation of the acceleration magnitude of earthquake shocks with time.

FIG. 2 is a perspective view of an earthquake detector constructed in accordance with one embodiment of the present invention, with the cover removed.

FIG. 2A is a partial bottom perspective view of the detector of FIG. 2.

FIG. 3 is a sectional side view of a mercury switch of the detector of FIG. 2.

FIG. 4 is a sectional end view of the switch of FIG. 3.

FIG. 5 is a plan view of a portion of the detector of FIG. 2.

DESCRIPTION OF THE PREFERRED EMBODIMENTS

Figure 6:
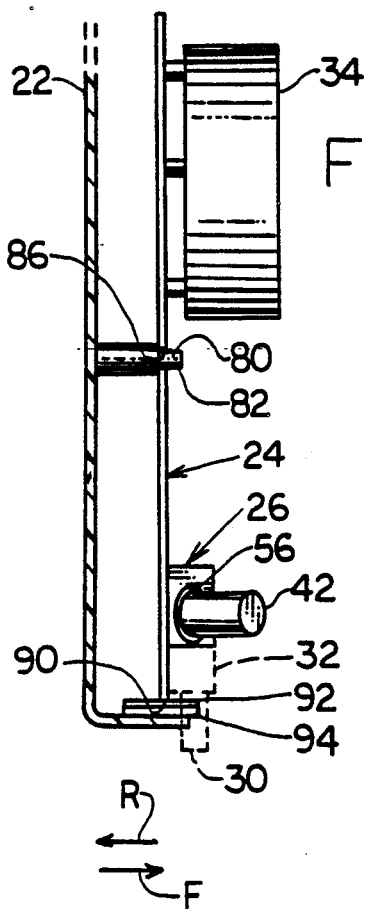
FIG. 6 is a sectional side view of a portion of the detector of FIG. 2.

FIG. 1 is a graph 10 that indicates waves produced by an earthquake, indicating the variations in force or acceleration level with time, at a location spaced a considerable distance from the epicenter of the earthquake, such as 20 miles away. The graph indicates the variation in acceleration level that might be recorded on graph paper moving in the direction of arrow 12 away from a recording stylus at the location 14. P-waves 16 are the first to arrive. Several seconds later, S-waves 18 arrive, which produce local accelerations about four times the magnitude of the P-waves. Both waves originate at the same time at the epicenter, but the P-waves are compression waves that travel at about 5.6 km/sec while the S-waves are lateral displacement waves that travel about one-half as fast. At a distance of about 20 miles (about 32 kilometers) from the epicenter, the leading edge 19 of the P-waves arrive about six seconds after the beginning of the earthquake, while the S-waves arrive about six seconds later. Of course, the actual velocities depend upon soil and other conditions.

The devices to be described below, are able to give warning of the imminent arrival of earthquake shocks of potentially destructive levels, by detecting the P-waves of substantial magnitude that indicate the imminent arrival of S-waves of larger and potentially destructive levels. A warning time of several seconds is sufficient for people to move away from earthquake-dangerous areas of a building to safer areas, such as away from windows that might shatter and to locations under door frames where they are safer from falling debris. Of course, the number of seconds of warning given to a person depends on his distance from the epicenter of the earthquake. However, since destructive earthquakes generally cause destruction over wide areas, most of the affected people can receive at least several seconds of warning. Thus, by detecting the P-waves which typically arrive several seconds before the more destructive S-waves, applicant provides several seconds of warning to people of impending potentially destructive earthquake shocks.

FIG. 2 illustrates an earthquake detector 20 which can detect P-waves and S-waves to sound an audible alarm that warns of the imminent arrival of potentially destructive earthquake shocks and/or warns of the actual arrival of such shocks so as to awaken people who would not be awakened by the actual potentially destructive shocks. The detector includes a housing 22 that can be attached to a main structural member M of a building such as a structural column or well-supported stud, which will shake when the earth shakes but which resists shaking from extraneous vibrations such as slamming of doors or running in a house. A circuit board 24 is mounted on the housing and carries a shake detector 26. A battery compartment 28 holds a battery that energizes the device. A person can turn on the device by operating a slider knob 30 of a switch 32. When a strong shock is detected, an audible alarm 34 is energized. The housing includes a main portion 36 with mounting holes 38, and a cover portion 40 that is snapped onto the main portion.

FIGS. 3-5 illustrate details of the shock detector 26. The shock detector includes two mercury-type switches 42, 44 that are commonly available as tilt sensors. Each switch such as 42 includes a cylindrical container 46 forming a chamber 48 that holds a quantity of electrically conductive liquid 50 such as mercury. A pair of electrodes 52, 54 lie at the inner end 56 of the chamber. When the container accelerates in a direction along its axis 60, the conductive liquid 50 "sloshes", and can move to a position wherein it contacts both electrodes 52 and 54 to electrically connect them. The mercury-type switch is sensitive primarily to acceleration parallel to its axis 60, and is relatively insensitive to accelerations perpendicular to its axis. The amount of acceleration required to close the switch largely depends upon the distance of the uppermost electrode 52 from the surface of the conductive liquid. The sensitivity can be varied by tilting the switch. For example, tilting the switch by an angle A wherein its inner end 56 moves downwardly with respect to its outer end 62, causes the surface of the liquid to assume the orientation indicated at 64, so there is a smaller distance between the surface of the liquid and the upper electrode 52, and the switch will close at a smaller acceleration level.

The direction of shaking of the earth depends to a large extent upon the direction of the epicenter of the earthquake from the building which contains the earthquake detector. As mentioned above, the switch 42 is sensitive primarily to acceleration along its axis 60. To provide about the same sensitivity to acceleration in any horizontal direction, applicant provides the second mercury-type switch 44 and orients it so its axis 66 along which it is primarily sensitive to accelerations, is perpendicular to the axis 60 of the other switch 42. It should be noted that shaking of the ground in any direction will cause shaking of a building in all directions, although not necessarily equally in all directions. The largest component of a P-wave is vertical.

Figure 7:
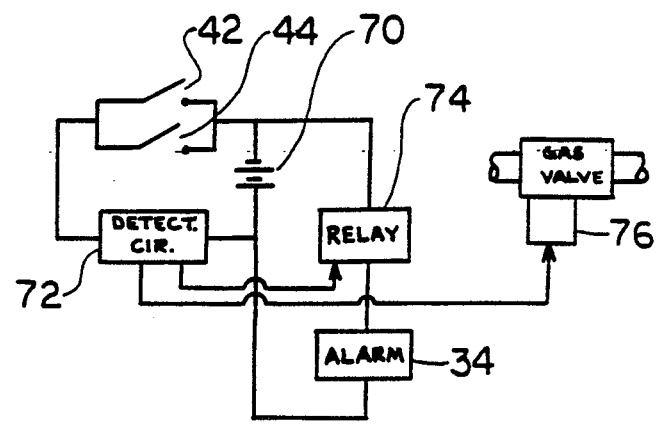
FIG. 7 is a simplified circuit diagram of the detector of FIG. 2, and also showing one way in which it can be used.

FIG. 7 is a simplified diagram of circuitry mounted primarily on the circuit board 24, which uses the switches 42, 44. The two switches 42, 44 are connected in parallel, and are connected in series with a voltage source 70 and a detector circuit 72. When the detector circuit detects a closing of one or both of the switches, it closes a relay 74 which connects the voltage source 70 to the alarm 34. Where the epicenter of the earthquake is many miles away, the alarm will begin sounding several seconds before the arrival of the potentially destructive S-waves. Even if the apparatus detects only the destructive S-waves, sounding of the alarm is useful to persons who might otherwise sleep through the earthquake and not take steps to protect themselves and others. The detection circuit 72 can also be used to automatically operate devices such as a turnoff mechanism 76 that turns off a gas valve to avoid gas explosions that are a threat after a major earthquake.

It is important to enable adjustment of the sensitivity of the earthquake detector. If the sensitivity is too great, the apparatus is more likely to be set off by extraneous events such as slamming of doors or running in a house, and the alarm will sound when minor earthquakes are detected which are not potentially destructive. When a person first installs the earthquake detector, he usually wishes to have relatively high sensitivity, which gives him assurance that the device is "working" by sounding an alarm when the more common minor earthquakes occur. That is, if a person "feels" the ground shaking due to a minor earthquake, but the earthquake detector does not sound an alarm, the person may be disappointed and wonder if the apparatus is working. After a while, the person is more likely to want less sensitivity to avoid disturbance from the alarm when there is no imminent danger.

As shown in FIG. 6, the circuit board 24 which holds the shock detector 26 and its two perpendicular mercury-type switches 42, 44, is pivotally mounted on the housing 22 to permit pivoting about a substantially horizontal axis 80. The housing includes two posts 82, 84 (also FIG. 2) that project through holes 86, 88 in the circuit board, the holes being larger than the posts to permit pivoting of the board on the posts. The lower edge 90 of the board presses against a flexible sheet 92 of felt held by double sided adhesive tape 94 to the housing. The knob 30 of switch 32 extends downwardly through a hole 96 (FIG. 2A) in the housing to permit a person to tilt the circuit board and therefore the shake detector 26 thereof, with the felt 92 holding the circuit board in any tilt position it is moved to.

Tilting of the circuit board affects the sensitivity of the mercury-type switches 42, 44. When the bottom of the board is tilted forward in the direction F, the mercury in the mercury-type switches moves towards the inner end 56 of the switches which increases their sensitivity. Similarly, movement of the bottom of the circuit board in the rearward direction R reduces the sensitivity of the switches. The mounting arrangement of the switches causes the sensitivity of each of them to increase or decrease for a particular direction of tilt of the circuit. A person may first tilt the bottom of the circuit board forward for maximum sensitivity. If he finds that the alarm is tripped when there are relatively mild earthquakes that he does not wish to be informed about, he may move the bottom of the circuit board back by perhaps one quarter of the total 1 movement. He may continue such movement until he finds that the alarm is not set off by earthquakes too mild to be of concern to him. He may also take into account any setting off of the alarm by other phenomena such as slamming of doors. In Southern California, most potentially destructive earthquakes occur during morning sleeping hours, when the alarm is unlikely to have been set off by extraneous factors such as slamming of a door or running of people in the house. Tilting of the shock detector 24 is also useful to avoid the effects of the main structural member not being plumb.

Figure 8:
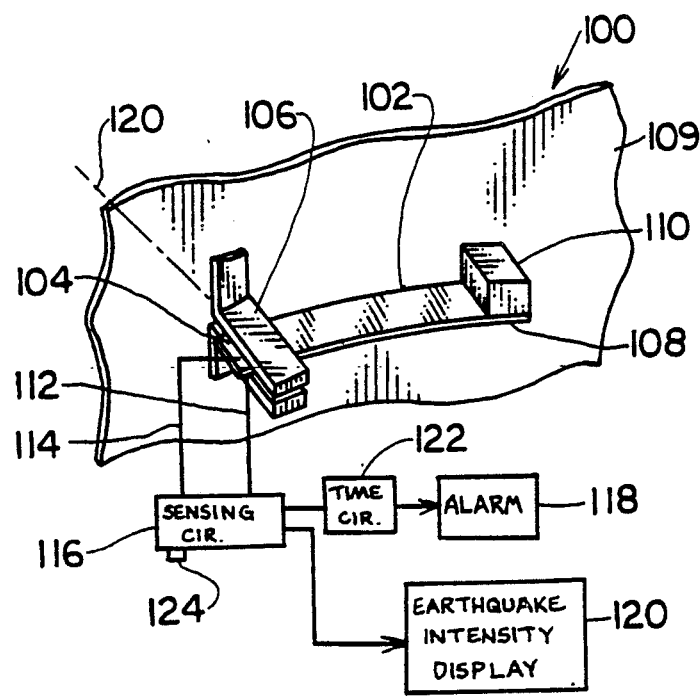
FIG. 8 is a simplified perspective view of an earthquake detector constructed in accordance with another embodiment of the invention.

FIG. 8 illustrates another earthquake detector 100 which includes a beam device 102 having an inner end 104 rigidly held in position and orientation by a mount 106, and having an outer end 108 that carries a weight 110. The beam device 102 is resilient and extends generally horizontal. When an earthquake occurs, the main building structural component to which the mount 106 is attached, as through a circuit board 109 and housing (not shown), moves vertically, while the weight 110 tends not to move vertically, and the beam device 102 bends. Such bending of the beam device causes its generation of an electrical signal over conductors 112, 114 to a sensing circuit 116. When the sensing circuit detects an electrical output indicating accelerations of a predetermined level, it sets off the alarm 118 to create a sound that will wake up and notify people about an earthquake. The sensing circuit can also operate an earthquake intensity display 120 that displays the perceived intensity of the earthquake, such as what its reading on the Richter scale would be for the acceleration measured, if the epicenter of the earthquake were very close. Detection of vertical acceleration is especially useful in detecting P-waves which produce primarily vertical acceleration.

The beam device 102 could be constructed of a simple spring material such as spring steel, and with a strain gauge attached to it, with the resistance of the strain gauge varying with bending of the beam, and with changes in the resistance constituting an electrical signal indicating the acceleration level of any earthquake shock. However, the production and mounting of strain gauges to beams is fairly expensive. Instead, applicant forms the beam device 102 as a thin sheet of piezoelectric material such as an approximately 1/1000th inch thick sheet of piezoelectric film sold by Kynar Piezo Film Company. Bending of such a film produces a small voltage output which can be measured by the sensing circuit 116 to determine the level of vertical acceleration. The sensitivity of the circuit 116 can be set to detect earthquakes whose local acceleration level is sufficient to cause damage, such as an acceleration level of 0.1 G (where G is the acceleration produced by gravity), by setting the circuit 116 to sound an alarm when it detects an acceleration level of one-fourth as much such as 0.025 G. This enables detection of the P-wave that arrives before the more powerful S-wave. The sensitivity of the detector is preferably between one-half and one-eighth the minimum level of a potentially destructive shock which is at least about 0.1 G. Thus, the detector is preferably set to sound an alarm when an acceleration level of at least about 0.025 G is detected. The earthquake monitoring laboratory at the California Institute of Technology controls chart recorders located around Los Angeles to begin recording upon detection of an acceleration of 0.01 G, and this is a level at which the detector can be set for high sensitivity.

The mount 106 which holds the inner end of the beam device 102 can be made tiltable about a largely horizontal axis 120 extending perpendicular to the beam device axis 120 (as by tilting of the circuit board 109 about such an axis) to vary the sensitivity of the device. However, since the beam device produces an output for acceleration levels of over about 0.005 G, sensitivity can be adjusted by a potentiometer 124 that varies the output of an amplifier (not shown) of the circuit 116 before the amplifier output is received by a threshold detecting circuit (not shown) of circuit 116.

When sounding the alarm 34 (FIG. 7) or 118 (FIG. 8) applicant prefers to sound the alarm so it is on for periods of one second that are each followed by periods of silence of one second duration. This continues for a period of one minute, at which time the circuit such as 72 is reset, so it will not energize the alarm until another earthquake is detected. Providing periods of silence of at least about one second between alarm soundings has the advantage of enabling a person to hear any noise indicating the effects of an earthquake, such as hearing glass breaking, persons hollering for help, etc. An off-period of at least one-half second is necessary for sounds to be comprehended. A timing circuit 122 which opens and closes every second is shown.

Thus, the invention provides an apparatus and method for detecting earthquakes, which can be used to provide warning of an imminent earthquake, and/or which provides a simple adjustable shock-detecting device. P-waves generated by an earthquake can be detected and an alarm sounded, to provide several seconds of warning of an imminent, more severe shock from imminent S-waves, where the epicenter of the earthquake is distant from the detector. For detection of an earthquake of predetermined local acceleration level, or shaking magnitude, the apparatus is set to detect accelerations of about one-fourth that level, and preferably between one-eighth and one-half of the level which is deemed potentially destructive. A detector can be formed by mercury-type switches which include conductive liquid that sloshes in a container when the container is shaken, to provide a low cost, readily available, and reliable sensor. Two of such mercury-type switches can be used which are oriented with their axes of sensitivity angled by about 90° from one another, or in any case at least about 45° from one another, to provide approximately equal sensitivity to shaking in any horizontal direction. Another alternative is to use a flexible beam which supports a weight at its outer end, and which produces an electrical output whose magnitude indicates flexing of the beam. The beam can be constructed of a sheet of piezoelectric material for low cost construction. Any of the detectors can be mounted so they can be tilted to vary their sensitivity. The alarm preferably sounds intermittently, with a silent period such as one second between soundings to allow persons to hear noises that aid in safety.

Although particular embodiments of the invention have been described and illustrated herein, it is recognized that modifications and variations may readily occur to those skilled in the art and consequently it is intended to cover such modifications and equivalents.

What is claimed is:

1. An earthquake detector that can be mounted on a structural member of a building comprising:

a plurality of switches, each including a container having an axis and inner and outer ends spaced along said axis, a quantity of an electrically conductive liquid in said container, and first and second terminals which can contact said liquid to complete an electrical connection between the terminals, at least a first of said terminals lying at said inner end of said container;

means for mounting said switches on the structural member of the building with the axis of each switch primarily horizontal, and with the first terminal of each switch above said liquid when the container is not shaken but with the first terminal at a level to have said liquid contact both said terminals when the container is subjected to shaking of a predetermined manner in a direction along its axis.

an energizable audible alarm;

a circuit coupled to said switches and said alarm for energizing said alarm when one of said switches is closed;

said switches oriented with their axes both primarily horizontal but angled from each other so each is sensitive primarily to shaking along a different direction.

2. The detector described in claim 1 wherein:

said mounting means includes a first part mountable on a structural member of a building and a second part tiltable about a largely horizontal axis on said first part and supporting said switches to enable tilting of said switches to control their sensitivities.

* * * * *